S. Ainsworth.
Fan.
N° 76875. Patented Apr. 21, 1868
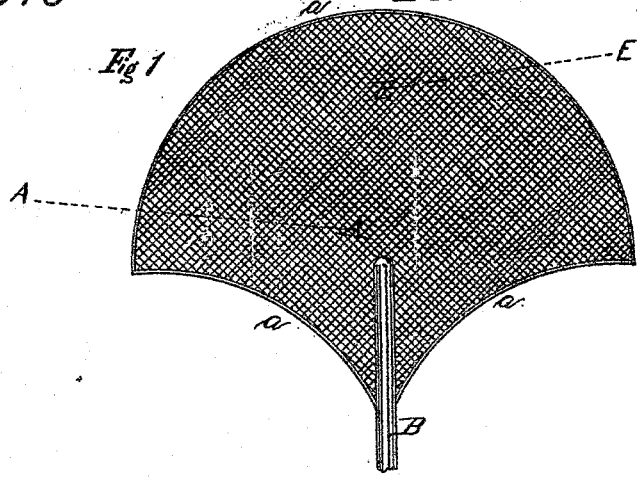
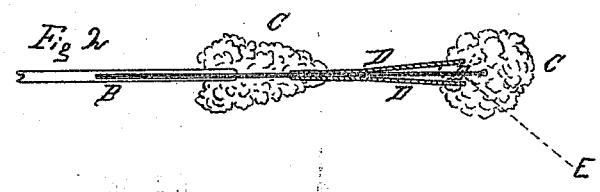
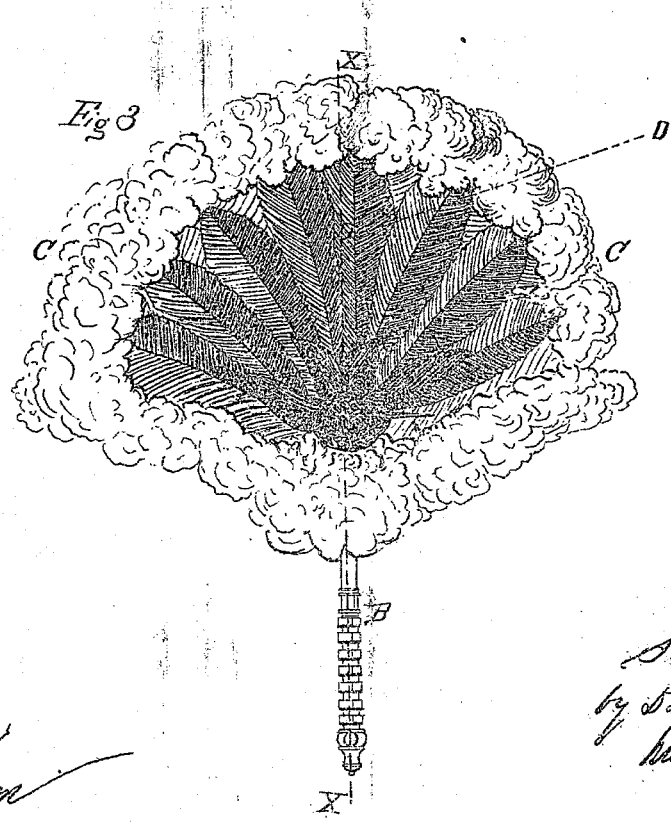
Witnesses
P. T. Dodge
U. S. Munn
Inventor
S. Ainsworth
by Dodge & Munn
his Atty's

United States Patent Office.

SEYMOUR AINSWORTH, OF SARATOGA SPRINGS, NEW YORK.

Letters Patent No. 76,875, dated April 21, 1868.

IMPROVEMENT IN FANS.

*The Schedule referred to in these Letters Patent and making part of the same.*

TO ALL WHOM IT MAY CONCERN:

Be it known that I, SEYMOUR AINSWORTH, of Saratoga Springs, in the county of Saratoga, and State of New York, have invented certain new and useful Improvements in Fans; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to fans, and consists of new combinations and arrangements of well-known materials, by which I produce a new, ornamental, and useful article of manufacture.

In the drawings—

Figure 1 is a plan view of the frame of my fan.

Figure 2 is a view of a longitudinal vertical section on the line $x\,x$ of fig. 3, and Figure 3 is a plan view of the fan complete.

In constructing my fan, I first make a frame, A, of one or two pieces of buckram, E, or other suitable material, shaped or cut in the form of a fan, with handle B attached, and having its edge strengthened with a piece of light covered wire, $a$, as shown in fig. 1. I then fasten around the edge of the frame A, down, C, by means of light thread, or in any other suitable manner, as shown in figs. 2 and 3. The central portion of the frame A, I cover with quills, D, on each side. The down, C, and quills, D, may be colored in any way to suit the taste of the manufacturer. The down may also be extended from the handle a short way towards the centre of the fan, and then be surmounted by a humming-bird or other desired ornament, as shown in fig. 3.

I am aware that fans have been made with their entire surface covered with down, but this I do not claim.

Having thus described my invention, what I do claim is—

As a new article of manufacture, a fan, composed of the buckram foundation, covered with quill-feathers throughout its centre, on both sides, trimmed on its edge with down, and provided with a handle, attached substantially as described, the whole constructed and shaped as shown.

SEYMOUR AINSWORTH.

Witnesses:
 J. T. CARR,
 H. CHEEVER.